Nov. 21, 1944.  M. KATCHER ET AL  2,363,335
STEERING MEANS FOR WATERCRAFT
Filed July 23, 1942  2 Sheets-Sheet 1

INVENTORS
MORRIS KATCHER
and STANLEY W. WALKER
BY Emanuel Scheyer
ATTORNEY

Nov. 21, 1944.   M. KATCHER ET AL   2,363,335
STEERING MEANS FOR WATERCRAFT
Filed July 23, 1942   2 Sheets-Sheet 2

INVENTORS
MORRIS KATCHER.
and STANLEY W. WALKER.
BY Emanuel Scheyer
ATTORNEY

Patented Nov. 21, 1944

2,363,335

UNITED STATES PATENT OFFICE 2,363,335

STEERING MEANS FOR WATERCRAFT

Morris Katcher and Stanley W. Walker,
New York, N. Y.

Application July 23, 1942, Serial No. 451,998

4 Claims. (Cl. 114—144)

This invention relates to steering means for boats, ships and other watercraft or the like. Besides having steering means substantially at the rear or stern of the watercraft, additional steering means are provided at or near the forward end or bow of the craft to increase its maneuverability, a desideratum especially for naval warfare. The forward steering means can be used to cooperate with the rear steering means to enable the boat to turn through a shorter radius than if only the rear steering means were used. The forward steering means may be synchronized in its operation with the rear steering means or it may be operated independently thereof. Besides being able to reduce the radius, the two steering means when suitably set with respect to each other can be used to give the boat lateral motion without rotation or with varying degrees thereof. A number of different constructions are shown for accomplishing the forward steering action. They could also be used at the rear of the craft. Under normal conditions, the rudder is used at the stern as the steering means, but where there are a plurality of propellers they can be used as the stern steering means as is well known to the art.

Other objects and advantages will become apparent upon further study of the description and drawings, in which.

Figure 4:
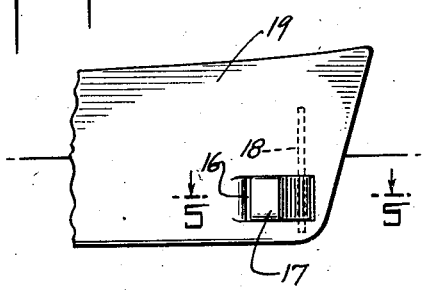
Fig. 4 is a partial elevation of a ship at its bow with a substantially triangular rudder hinged thereto.
Figure 5:
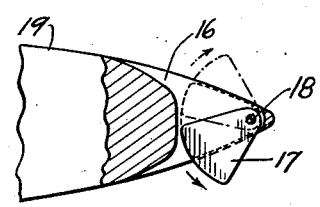
Fig. 5 is a sectional plan taken along the line 5—5 of Fig. 4.

The bow of boat 19, Figs. 4 and 5, is provided with a transverse opening 16 in which is mounted rudder 17. Said rudder is of triangular prismoidal form. It is fixedly mounted on shaft 18 so that it may be swung about a substantially vertical axis. Shaft 18, which is the means for operating rudder 17 is in turn adapted to be rotated by suitable steering gear, not shown, such gear being well known to the art. When rudder 17 is not in use it lies within opening 16, that is, it is in neutral position as shown by the dash lines. The sides of the rudder when in neutral position conform substantially to the lines of the boat so that there is a minimum of resistance to the travel of the boat.

Figure 1:
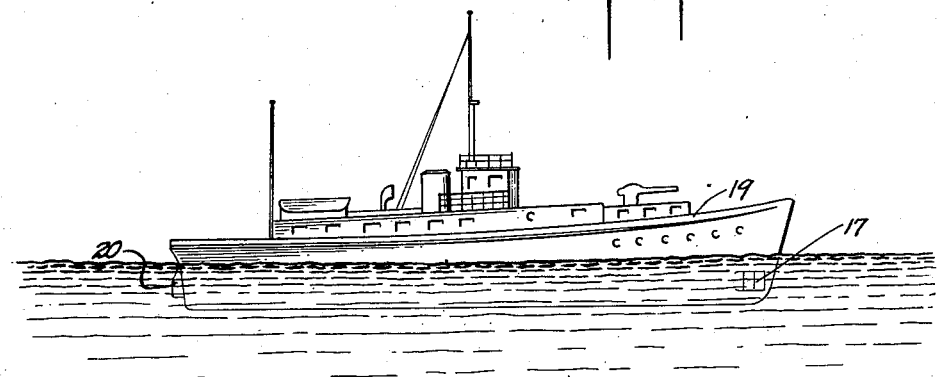
Fig. 1 shows a ship equipped with steering means fore as well as aft.
Figure 2:
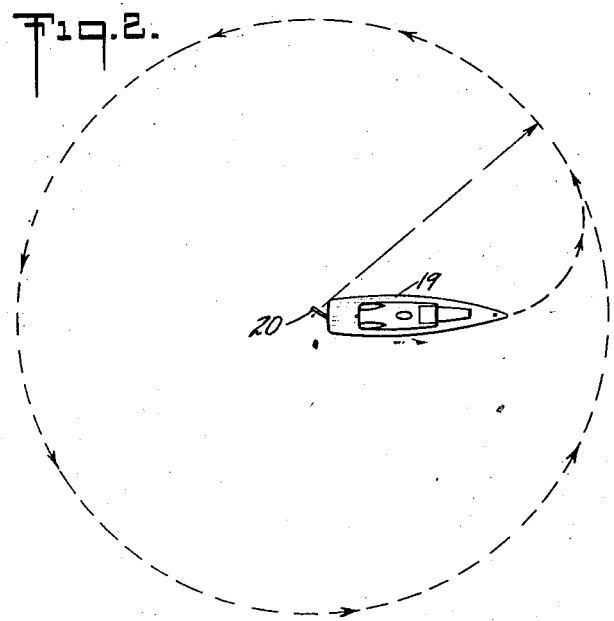
Fig. 2 shows the path of the ship for certain assumed settings of a standard rear rudder.
Figure 3:
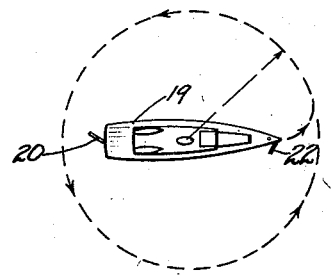
Fig. 3 shows the path of the same ship for the same settings of the rear rudder but with the added effect of the fore rudder.

With rudder 17 shown in the position indicated by the solid lines, the tendency is to cause the boat 19 to turn in a counter-clockwise direction. With rudder 17 set as indicated by the solid lines, and rear rudder 20 set as shown in Fig. 3, boat 19 is enabled to be turned more sharply in a counter-clockwise direction, than if the boat just had rear rudder 20 as in Fig. 2. With rudder 17 set as shown by the dash lines of Fig. 5, it is in neutral position and does not affect the steering of the boat. With rudder 17 in the position shown for it by the dot and dash lines of Fig. 5, the tendency is to turn the boat in a clockwise direction. With rudder 17 set as last noted and rudder 20 set as shown in Fig. 3, when a forward propelling force is applied to the boat, it will move diagonally forward, upward and to the right in Fig. 3, substantially no rotation of the boat taking place. In other words, the motion is one of substantially pure translation. Such a motion is of value in docking a ship or when it is desired to come up broadside to another vessel.

Figure 6:
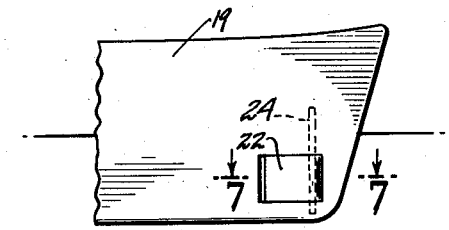
Fig. 6 is a partial elevation of a ship at its bow showing the near leaf of a double leaved rudder hinged thereto.
Figure 7:
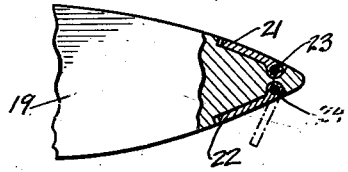
Fig. 7 is a sectional plan taken along the line 7—7 of Fig. 8.

The fore steering means shown in Figs. 6 and 7 comprises two separately mounted leaf rudders 21 and 22. Rudder 21 is fixedly mounted on rotatable shaft 23, while rudder 22 is fixedly mounted on shaft 24. Shafts 23 and 24 are rotated as desired by steering gear, not shown, which is well known to the art. Shafts 23 and 24 are the means for rotating rudders 21 and 22. The dot and dash position of rudder 22, shown in Fig. 7, corresponds to that shown for it in Fig. 3, and produces the steering effect shown in the latter figure. With rudder 22 extended as shown by the dot and dash lines, rudder 21 is nested in the boat for maximum steering effect. With rudder 21 extended, rudder 22 is nested in the boat for maximum steering effect in the opposite direction. Rudders 21 and 22 are so formed and mounted in the sides of the boat or watercraft, that when nested therein in neutral position they conform to the lines of the boat.

Figure 8:
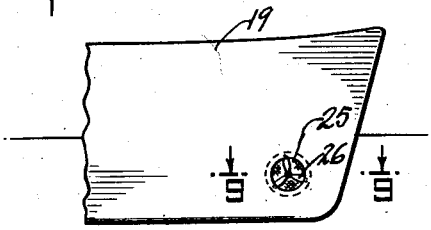
Fig. 8 is a partial elevation of a ship at its bow showing a transverse opening through it and a pump located in the opening.
Figure 9:
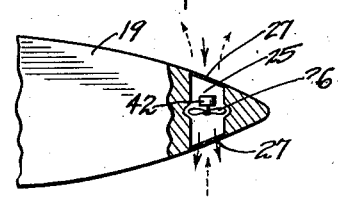
Fig. 9 is a sectional plan taken along the line 9—9 of Fig. 8.

In Figs. 8 and 9 is shown an hydraulic means of steering the boat at its bow. A transverse passage 25 is provided near the bow and below the waterline. Mounted in passage 25 is a pump, the particular pump shown having a propeller 26, but of course it will be readily understood that other forms of pump can be used. A reversible motor 42 is used to rotate propeller 26. The ends of passage 25 are provided with screens 27 to keep out foreign matter, the screens conforming to the lines of the boat. When it is desired to turn the bow of the boat as in Fig. 3, propeller 26 is rotated so that water is sent through passage 25 in the direction of the solid arrows in Fig. 9. To turn the front of the boat in the opposite direction, the propeller is rotated in a direction opposite to that noted above, causing water to be sent through passage 25 in the direction of the dotted arrows.

Figure 10:
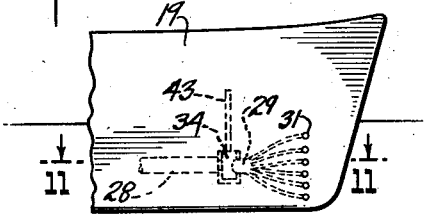
Fig. 10 is a partial elevation of a ship at its bow showing a series of transverse openings through which jets of steam are to be blown on the injector principle. The screens at the ends of the passages are omitted.
Figure 11:
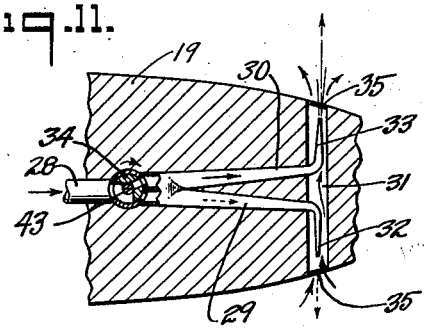
Fig. 11 is a sectional plan along the line 11—11 of Fig. 10, but taken to a larger scale than the latter figure, a portion of the bow and a portion of the manifold being broken away.

In Figs. 10 and 11, an injector type of pump is used. Steam is led through pipe 28 from a source, not shown, in the boat. At its forward end, pipe 28 is connected to a manifold having a set of pipes 29 to starboard and another set 30 to port. Pipes 29 are provided with nozzles 32 which are directed to starboard and pipes 30 are provided with nozzles 33 which are directed to port. A set of transverse passages 31 of relatively small diameter are provided, each passage containing one nozzle 32 and one nozzle 33. Controlling the entrance of steam from pipe 28 to the manifold pipes 29 and 30 is a valve 34. When valve 34 is set by its stem 43 as shown in Fig. 11, steam is led from pipe 28 to port nozzles 33. As is well known to the art, a high velocity jet issuing to port through a nozzle 33 inside a narrow passage, such as a passage 31, will force a flow of water through said passage to port. It will be evident then, with the valve setting shown, that water will be sent through all the passages 31 to port, as shown by the solid arrows, causing the bow of the craft to turn to starboard. If valve 34 is turned to send steam through starboard pipes 32, water is forced through passages 31 to starboard, causing the bow of the boat to swing to port as in Fig. 3. Screens 35 are provided at the ends of passages 31, streamlining with the sides of the craft. When valve 34 is set in neutral position, steam is prevented from entering any of manifold pipes 29 and 30.

Figure 12:
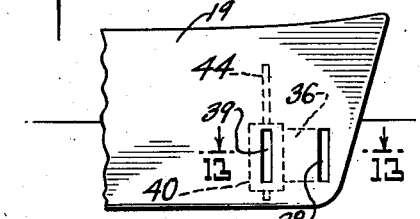
Fig. 12 is a partial elevation of a ship at its bow, showing a pair of ports on the side of the ship below the water line, the screens being omitted from the ports for clarity.
Figure 13:
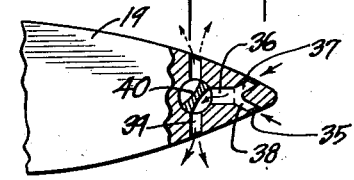
Fig. 13 is a sectional plan taken along the line 13—13 of Fig. 12 showing the ports leading to passages, the flow through which is controlled by a valve.

Water is caused to flow from one side of the boat to the other also by the steering means shown in Figs. 12 and 13, except that in this case the flow is effected by the motion of the craft itself. A common passage 36 is provided at the bow substantially along the longitudinal axis of the boat. Leading off from the front of passage 36 and inclining toward port is branch passage 37. Also leading off from the front of passage 36 and inclining toward starboard is branch passage 38. At the junction of passage 36 and transverse passage 39 is located a valve 40. Streamlined screens 35 are provided to protect the passages from debris. With valve 40 in the position shown in Fig. 13, the water entering passage 36 from branch passages 37 and 38 is discharged to starboard through transverse passage 39. Under these conditions the bow of the boat is turned to port as in Fig. 3. If valve 40 is turned opposite hand from that shown in Fig. 13, the water is discharged to port as shown by the dotted arrows turning the bow of the ship to starboard. Stem 44 is used to rotate valve 40. When valve 40 is set to block off passage 39, no steering effect is produced.

Figure 14:
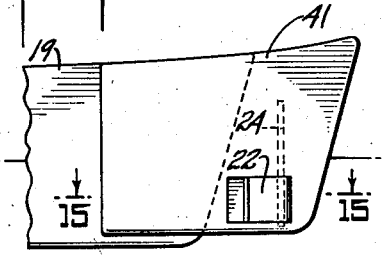
Fig. 14 is a partial elevation of a ship at its bow with an auxiliary structure added thereto, said structure containing steering mechanism of the type shown in Figs. 6 and 7.
Figure 15:
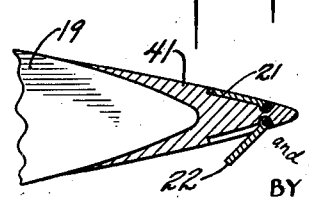
Fig. 15 is a sectional plan taken along the line 15—15 of Fig. 14.

Figs. 14 and 15 illustrate an auxiliary structure 41 which can be added to the front of a ship 19 to provide the forward steering means without requiring extensive alterations of the ship. The steering means shown on auxiliary structure 41 is the same as that shown in Figs. 6 and 7, leaf rudders 21 and 22 being provided.

The steering means of Figs. 9, 11 and 13 all have the same underlying principle in that a stream of water is caused to be discharged from a side of the boat near its bow.

In order to increase the effect of front steering, some of the steering means just described may be used together, thus the rudders of Fig. 7 may be provided on a ship together with the steering means of Fig. 13. The turning of rudders 21 and 22 can be synchronized with the turning of valve 40 by mechanism well known to the art.

Throughout the figures no detailed mechanism is shown for operating the steering means as such mechanism is well known to the art.

We claim:

1. In a watercraft, conduit means extending therethrough, the forward portion of the means extending from the bow in a substantially stem to stern direction while the rear of the means extends transversely, the front of the means being open and below the waterline, to receive water due to the forward propulsion of the craft, the rear portion of said means extending to both sides of the craft to discharge from the sides the water so received, means for controlling the flow of water through said conduit means, said flow controlling means having the water received by said forward portion pass through it and permitting more water so passing to issue from said rear portion on one side of the craft or the other in accordance with its setting for effecting the steering of the craft, said flow controlling means when set to permit the issuance of more water from said rear portion to one side of the craft, closing off said rear portion against the issuance of water to the other side of the craft, for effecting the steering of the craft toward the side closed off.

2. In a watercraft, a bow having a substantially T-shaped passage therethrough, the stem of the T extending longitudinally of the craft with its forward end below the waterline and open to the entrance of water, the forward propulsion of the craft forcing water into said stem, the head of the T extending transversely of the craft with its ends open to discharge from opposite sides of the craft the water forced into said stem, and means for controlling the flow through said head of the water received from the stem, said flow controlling means having said water pass through it and permitting more water so passing to issue from said head on one side of the craft or the other in accordance with its setting, said means when set to permit the issuance of more water from the head on one side of the craft, closing off the head against the issuance of water to the other side of the craft for effecting the steering of the craft toward the side closed off.

3. In a watercraft, conduit means extending therethrough, the forward portion of the means extending from the bow in a substantially stem to stern direction while the rear of the means extends transversely, the front of the means being open and below the waterline, to receive water due to the forward propulsion of the craft, the rear portion of said means extending to both sides of the craft to discharge from the sides the water so received, means for controlling the flow of water through said conduit means, said flow controlling means having the water received by said forward portion pass through it when set to steer the craft and stopping said flow when set not to steer, said flow controlling means in accordance with its setting permitting the water passing through it to issue from said rear portion in greater volume on one side of the craft or the other for determining the direction of the craft, and means for setting the flow controlling means said flow controlling means, when set to permit the issuance of more water from said rear portion to one side of the craft, closing off said rear portion against the issuance of water to the other side of the craft, for effecting the steering of the craft toward the side closed off.

4. In a watercraft, a conduit extending through the bow of the craft, the forward portion of the conduit extending in a substantially stem to stern direction while its rear portion extends transversely in the forward portion of the craft, the front of the forward portion being open and below the waterline, receiving water due to the forward propulsion of the craft, the rear portion of the conduit extending to both sides of the craft below the waterline at the forward portion of the latter to discharge from the sides of the craft the water so received, a chamber provided at the junction of said portions, and a valve stem mounted to rotate in the chamber, said stem deflecting by the impact thereof against it the water received from said forward portion, directing the water so deflected to issue from said rear portion on one side of the craft or the other in accordance with the angular position of the stem in said chamber, thereby effecting the steering of the craft away from the side to which the water is deflected.

MORRIS KATCHER.
STANLEY W. WALKER.